Oct. 17, 1933.　　　O. IRION　　　1,930,519
DRY RECTIFIER
Filed April 2, 1931
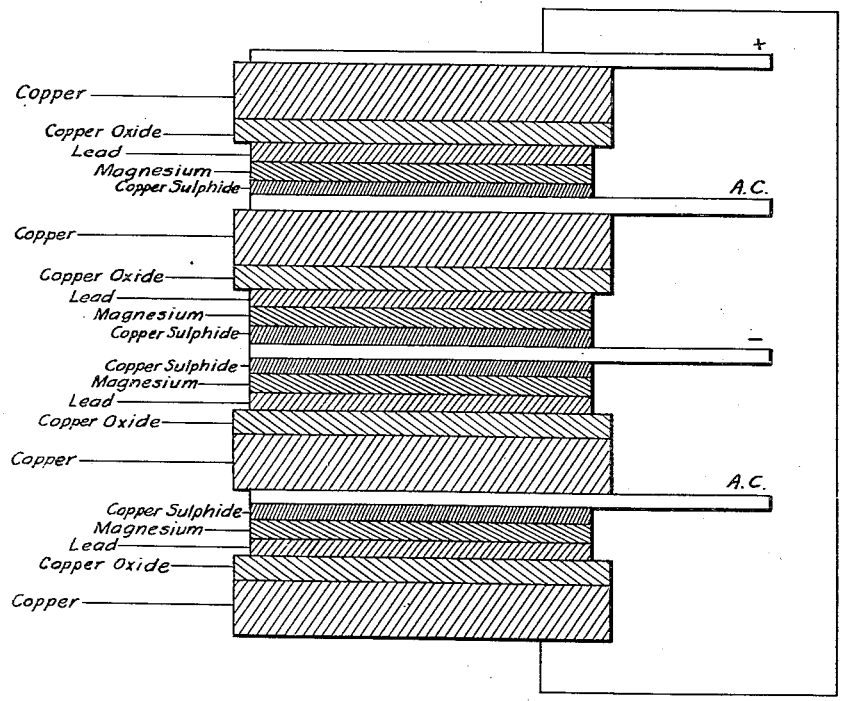
WITNESSES:
INVENTOR
Otto Irion
BY
ATTORNEY

UNITED STATES PATENT OFFICE 1,930,519

DRY RECTIFIER

Otto Irion, Berlin-Wilmersdorf, Germany, assignor to Westinghouse Electric & Manufacturing Company, a corporation of Pennsylvania Application April 2, 1931, Serial No. 527,345, and in Germany April 2, 1930

2 Claims. (Cl. 175—366)

My invention relates to dry rectifiers and more particularly to an arrangement of dry rectifiers.

Dry rectifiers can be divided into two classes differing substantially from each other. The first class is the oxide rectifiers in which the valve action takes place at or in the limiting layer between the metal proper and the coating of oxide produced directly upon the metal. The second class is the so-called contact rectifiers in which the active coating is on the surface of one of two electrodes and becomes the seat of a valve action only when the other electrode is brought into contact with the first mentioned electrode. Each of these two kinds of rectifiers has its peculiarity.

With the oxide rectifier, for example, it is possible without further difficulty to connect in series a plurality of similar rectifier units. The voltage applied to the series then distributes itself uniformly amongst the units. In that case the distribution of the voltage may be called stable. The voltage against which each individual rectifier unit is capable of exerting a valve action is relatively small.

With the contact rectifiers, on the contrary, it is generally possible to employ a higher voltage per rectifier unit, but they are not suitable for connecting a plurality of units in series to an alternating current source. The reason therefor seems to lie in the fact that the contact-rectifier unit develops its full valve effect only after a certain amount of current has passed through it in the direction to be suppressed. The time at which this current conduction takes place is, however, different in the individual contact-rectifier units and the distribution of voltage amongst the rectifier units is for this reason not uniform. A connection in series of that kind must therefore be called instable.

In order to combine a greater number of contact-rectifier units to a rectifier pile and to connect the same to a higher alternating voltage, it was hitherto necessary to employ a transformer having on its secondary a number of tappings corresponding to the number of rectifier units, and to connect the rectifier units with these tappings. It was only by this means that it was possible to distribute the voltage equally among the individual units.

The object of my invention is to eliminate the above drawbacks and to provide a dry-rectifier arrangement working in a completely stable manner. This is achieved, according to my invention, by connecting each of the oxide-rectifier units in series with a contact-rectifier unit.

The figure illustrates a preferred form of connection.

Combinations of units of that kind may be connected in series up to any number and operated at a correspondingly high alternating voltage. The distribution of the voltage obtained thereby is completely uniform. It has further proved that the arrangement according to the invention can be operated at a substantially higher voltage per combination of units than would be permissible for a single oxide-rectifier unit. The reason for this is that generally the greater part of the voltage is taken by the contact rectifier which has a higher resistance in the direction of flow of current and that the oxide rectifier, which has a smaller resistance, is only subjected to a voltage of corresponding value during the very short period, in which a passage of current takes place in the direction of suppression of the current. The oxide rectifier is however, as experience shows, capable of withstanding this overstraining.

The distribution of voltage between the contact-rectifier unit and the oxide-rectifier unit depends upon the current density, obtaining in each of the two units. By giving different dimensions to the cross section of the two units through which the current flows, one is, therefore, able to fix the distribution of the voltage in a predetermined manner. The contact rectifier is as a rule capable of standing a much higher current density than the oxide rectifier which is much more sensitive to heat. That property can advantageously be made use of to achieve an appreciable saving in material. As an oxide rectifier, the cuprous oxide rectifier is considered best. As contact rectifiers those with compounds of sulphide of copper, iodide of copper and other metallic compounds can be employed.

I claim as my invention:—

1. An arrangement of dry rectifiers consisting of a plurality of oxide-rectifier and contact-rectifier units, characterized by each oxide-rectifier unit being connected in series with one contact-rectifier unit.

2. An arrangement of dry rectifiers as claimed in claim 1, characterized by the contact-rectifier units being dimensioned for a higher current density than the oxide-rectifier units.

OTTO IRION.